US008646050B2

(12) United States Patent
Vidrine et al.

(10) Patent No.: US 8,646,050 B2
(45) Date of Patent: Feb. 4, 2014

(54) SYSTEM AND METHOD FOR SUPPORTING JIT IN A SECURE SYSTEM WITH RANDOMLY ALLOCATED MEMORY RANGES

(75) Inventors: Jacques Anthony Vidrine, San Francisco, CA (US); Lionel Divyang Desai, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 13/008,880

(22) Filed: Jan. 18, 2011

(65) Prior Publication Data

US 2012/0185700 A1 Jul. 19, 2012

(51) Int. Cl.
*G06F 7/04* (2006.01)

(52) U.S. Cl.
USPC ................................ 726/4; 717/146; 717/148

(58) Field of Classification Search
USPC .......................................... 713/189; 717/148
See application file for complete search history.

(56) References Cited

U.S. PATENT DOCUMENTS

| | | | | | |
|---|---|---|---|---|---|
| 5,412,717 | A * | 5/1995 | Fischer | ......................... | 713/156 |
| 6,308,315 | B1 * | 10/2001 | Dice et al. | ..................... | 717/106 |
| 6,647,495 | B1 * | 11/2003 | Takeuchi et al. | .............. | 713/189 |
| 6,760,906 | B1 * | 7/2004 | Odani et al. | .................. | 717/149 |
| 6,883,165 | B1 * | 4/2005 | Blandy et al. | ................. | 717/148 |
| 6,922,782 | B1 * | 7/2005 | Spyker et al. | ................ | 713/161 |
| 6,973,648 | B1 * | 12/2005 | Inagaki et al. | .................... | 718/1 |
| 7,191,422 | B1 * | 3/2007 | Tourancheau et al. | ........ | 716/122 |
| 7,526,811 | B1 * | 4/2009 | Taylor | ............................. | 726/26 |
| 7,546,430 | B1 * | 6/2009 | Miller et al. | .................. | 711/163 |
| 7,634,778 | B2 * | 12/2009 | Mosier et al. | ................. | 719/318 |
| 2002/0082905 | A1 * | 6/2002 | Matsuda et al. | ................ | 705/10 |
| 2002/0099563 | A1 * | 7/2002 | Adendorff et al. | ................ | 705/1 |
| 2004/0230958 | A1 * | 11/2004 | Alaluf | ........................... | 717/140 |
| 2004/0243986 | A1 * | 12/2004 | Nishiyama | .................... | 717/139 |
| 2006/0004981 | A1 * | 1/2006 | Bains | ............................ | 711/202 |
| 2006/0009112 | A1 * | 1/2006 | Guenther | ...................... | 446/175 |
| 2007/0011091 | A1 * | 1/2007 | Smith | ............................. | 705/39 |

(Continued)

FOREIGN PATENT DOCUMENTS

WO WO 2008/067329 A1 6/2008

OTHER PUBLICATIONS

Jianhui Li et al. "Module-Aware Translation for Real-life Desktop. Applications," Jun. 12, 2005, Software and Solutions Group. Intel Corporation, VEE '05 Proceedings of the 1st ACM/USENIX international conference on Virtual execution environments pp. 89-99.*

(Continued)

*Primary Examiner* — Luu Pham
*Assistant Examiner* — Sanchit Sarker
(74) *Attorney, Agent, or Firm* — Blakely, Sokoloff, Taylor & Zafman LLP

(57) ABSTRACT

Disclosed herein are systems, methods, and non-transitory computer-readable storage media for processing just-in-time code at a device that enforces a code signing requirement. The disclosure includes receiving computer code, where a portion of the code includes executable just-in-time code, at a device that enforces a code signing requirement; identifying the unsigned just-in-time executable portion of code; allocating a randomly selected memory region on the device for at least some of the unsigned just-in-time executable portion; and executing the unsigned just-in-time executable portion of code in the randomly selected memory region as if the unsigned just-in-time executable portion of code was signed computer code.

27 Claims, 6 Drawing Sheets

(56) References Cited

U.S. PATENT DOCUMENTS

| | | | | |
|---|---|---|---|---|
| 2007/0283117 | A1* | 12/2007 | Krishnaswamy et al. | 711/163 |
| 2007/0283336 | A1* | 12/2007 | Gschwind et al. | 717/148 |
| 2008/0126742 | A1* | 5/2008 | Shupak et al. | 711/217 |
| 2008/0163242 | A1* | 7/2008 | Furuichi et al. | 719/310 |
| 2008/0184210 | A1* | 7/2008 | Lee et al. | 717/136 |
| 2008/0184365 | A1* | 7/2008 | Matsushita | 726/21 |
| 2009/0082884 | A1* | 3/2009 | Bonnat | 700/83 |
| 2009/0125717 | A1* | 5/2009 | Suzuoki et al. | 713/166 |
| 2009/0172798 | A1* | 7/2009 | Upp | 726/10 |
| 2009/0193399 | A1* | 7/2009 | Mitran et al. | 717/139 |
| 2009/0271876 | A1* | 10/2009 | Takagi | 726/30 |
| 2011/0191848 | A1* | 8/2011 | Zorn et al. | 726/22 |
| 2012/0185700 | A1* | 7/2012 | Vidrine et al. | 713/189 |

OTHER PUBLICATIONS

Stefan Esser, "Adding ASLR to Jailbroken iPhones," Dec. 2010, Sektion Eins.*

Ping Chen et al., "JITDefender: A Defense Against JIT Spraying Attacks,"2011, IFIP AICT 354, pp. 142-153.*

PCT/US2012/021696 International Search Report and Written Opinion of the International Searching Authority; mailed on May 14, 2012 (11 pages).

John Gruber: "Android 2.2 Handily Beats iOS4 in JavaScript Benchmarks", DaringFireball.net, Jul. 22, 2010, XP55024165, Retrieved from the Internet: URL:http://daringfireball.netilinked/201 0107/22/android-ios-js-benchmarks [retrieved on Apr. 11, 2012].

Ryan Paul: "Android 2.2 demolishes i084 in JavaScript benchmarks", arstechnica.com, Jul. 7, 2010, XP55024192, Retrieved from the Internet: URL:http://arstechnica.com/gadgets/news/201 0107/android-22-demolishes-ios4-in-javascript-benchmarks.ars [retrieved on Apr. 11, 2012].

Keith: "Creating iPhone Ad Hoc Distribution builds",Dec. 23, 2010, XP55024169, Retrieved from the Internet: URL:http://useyourloaf.com/blog/20 1 0/12/23/creating-iphone-ad-hocdistribution-builds.html?printerFriendly=true [retrieved on Apr. 11, 2012].

Stefan Esser: "Adding ASLR to jailbroken iPhones", Dec. 16, 2010, XP55024213, POC 2010 Seoul, Korea Retrieved from the Internet: URL:http://antidOte.com/POC2010-Adding-ASLR-To-JailbrokeniPhones.pdf [retrieved on Apr. 11, 2012].

Google: "Signing your applications—Android Developers",Nov. 12, 2010, XP55024193, Retrieved from the Internet: URL:http://web.archive.org/web/20101112143257/http:11developer.android.com/guide/publishing/app-signing.html [retrieved on Apr. 11, 2012].

Dion Blazakis: "Interpreter Exploitation: Pointer Inference and JIT Spraying",,Dec. 31, 2010, XP55024203, Black-Hat 2010 conference Las Vegas Retrieved from the Internet: URL: http://www.semantiscope.com/research/BHOC2010/BHOC-2010-Paper.pdf [retrieved on Apr. 11, 2012].

Enea Android Team: "Share memory using ashmem and binder in the android framework", Mar. 22, 2010, XP55024202, Retrieved from the Internet: URL:http://www.androidenea.com/201 0103/share-memory-using-ashmemand-binder-in.html [retrieved on Apr. 11, 2012].

PCT International Preliminary Report on Patentability (Chapter I) for corresponding International Application No. PCT/US2012/021696, mailing date Aug. 1, 2013, 9 pages.

"How do I enable DEP or ASLR for my .NET application?" Stack OverFlow, Jul. 3, 2010, stackoverflow.com/questions/3172710/how-do-i-enable-dep-or-aslr-for-my-net-application.

Shay, Jimmy, "'Antid0te' Coming to Boost Security for Jailbroken iPhones," McAfee Blog Central, Dec. 13, 2010, blogs.mcafee.com/mobile/antid0te-coming-to-boost-security-for-jailbroken-iphones.

Vincenzo lozzo, "Rop and iPhone," blog.zynamics, Apr. 16, 2010, downloaded Oct. 28, 2013, from http://blog.zynamics.com/2010/04/16/rop-and-iphone/.

* cited by examiner

```
<html>
<head>
<title>Hello world</title>
<script type="text/javascript">          304
      function helloworld()
            {
             alert("Hello world!") ;
            }
</script>

</head>

<body>
           <center>
           <input type="button" onclick="helloworld()" value="click Me" />
           </center>

</body>
</html>
```

306 (brace: <script type="text/javascript"> … </script>)

308 (brace: <body> … </body>)

SYSTEM AND METHOD FOR SUPPORTING JIT IN A SECURE SYSTEM WITH RANDOMLY ALLOCATED MEMORY RANGES

BACKGROUND

1. Technical Field

The present disclosure relates generally to just-in-time code, and, in particular, to processing unsigned just-in-time code at a device that enforces a code signing requirement.

2. Introduction

Security and performance are some of the most coveted features in technology. The need for better security and performance in computing devices appears with regularity in a score of varying circumstances. And while the growing complexity of software demands higher performance, and the rising prevalence of security threats demands improved security, developers face the increasingly difficult challenge of designing a system that provides improved security and performance. Not an exclusive improvement of either one, but an overall improvement of both. Often, developers improve performance, or security, but rarely both together—typically because enhanced security can hinder performance, and vice versa.

One technique for improving security is code signing. Code signing is the process of digitally signing computer code to allow the system to determine the source (such as an author or publisher) of the code, and/or ensure that the code has not been altered or corrupted. Typically, the signer (e.g., an author or a publisher) generates a message digest of the code and encrypts the digest using a private key. To sign the code, the signer then inserts the encrypted digest and a digital certificate, including a public key that corresponds to the private key, into the code. The user's computer verifies the signature by creating a digest of the code, decrypting the signer's encrypted digest using the public key from the digital certificate, and comparing the results. If the two digests match, the signature is valid. With code signing, impostors and malicious attackers are significantly limited in their ability to usurp resources on the device to execute unauthorized code. Overall, code signing facilitates the identification of genuine applications and creates a better and more trustworthy user experience. Unfortunately, however, code signing is unavailable for code compiled just-in-time.

Just-in-time (JIT) compilation refers to on-demand—or "just-in-time"—translation of computer code into machine instructions. With JIT, translation occurs continuously, and translated code can be cached to increase performance and provide faster code execution. Not surprisingly, JIT is a popular technique for improving the runtime performance of programs.

Nevertheless, JIT suffers from several limitations. First, developers cannot digitally sign code compiled on the fly. As a result, JIT strips a system of its ability to perform code signing vis-à-vis JIT code. In fact, secure systems that enforce code signing requirements are unable to run JIT code. Second, JIT compilers are often subject to memory manipulation attacks: attackers use JIT to create regions of memory at a predictable address, copy their payload into the region of memory, and execute their code. Thus, while JIT provides certain benefits, security limitations can pose significant risks—all of which are aggravated by the absence of code signing technologies.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for processing just-in-time code at a device that enforces a code signing requirement. The present disclosure provides a way to implement JIT in a secure system running code signing technologies, while significantly minimizing, via address space layout randomization (ASLR), the memory manipulation vulnerabilities present in JIT. Code signing and ASLR are complementary security techniques. Together, they provide enhanced security protections which, when implemented to support JIT capabilities, result in security and performance improvements.

The system of the disclosure processes just-in-time code in accordance with a code signing requirement at a device. An application on the system receives computer code, such as an HTML document, and identifies an unsigned just-in-time executable portion of code, such as, for example, a JavaScript script, in the computer code. The application then allocates a randomly selected memory region on the device for at least some of the unsigned just-in-time executable portion of code. In one aspect, only one randomly selected memory region for the unsigned just-in-time executable portion of code can be allocated per process. In another aspect, more than one randomly selected memory region for the unsigned just-in-time executable portion of code can be allocated per process. In yet another aspect, one or more randomly selected memory regions and one or more non-randomly selected memory regions for the unsigned just-in-time executable portion of code can be allocated per process.

In one embodiment, the system then exempts the randomly selected memory region from the code signing requirement, and the application executes the unsigned just-in-time executable portion of code stored in the exempted region of memory. Accordingly, the application can execute the unsigned just-in-time executable portion of code without the extra step of exempting the randomly selected memory region from the code signing requirement.

The method is illustrative of the disclosure, and the principles associated with the method are applicable to the system and computer-readable medium. The method is discussed in terms of a system configured to practice the method. The system can be any physical and/or virtual device that enforces a code signing requirement (e.g., a secure system running code signing technologies). The system first receives computer code, where a portion of the code includes unsigned, executable just-in-time code. The system then identifies the unsigned just-in-time executable portion of code, and allocates a randomly selected memory region on the device for at least some of the unsigned just-in-time executable portion. Identification can be based on a just-in-time flag in the code; a parser or other identifying component that extracts the just-in-time executable portion; a table of locations of just-in-time executable portions; a specific feature, characteristic, attribute, pattern or structure of the code; or any other form of identification such as identification through code analysis.

Next, the system executes the unsigned just-in-time executable portion in the randomly selected memory region as if the unsigned just-in-time executable portion of code was signed computer code. In one aspect, the unsigned just-in-time executable portion of computer code is processed by an application with a specific entitlement—for example, a web browser. The specific entitlement ensures that the application has permission to process unsigned code. A specific entitlement can be a permission flag, attribute, reference, descriptor, or any other feature enforced by the operating system. The specific entitlement of the application can be granted based on a certificate and a provisioning profile, and enforced through public key infrastructure (e.g., a public and private cryptographic key pair obtained and shared through a trusted authority) and one or more operating system level mechanisms (e.g., authentication, security policy, access controls, security protocols, cryptographic software and protocols, etc).

Other versions of the method of the disclosure can include executing just-in-time code in a device that enforces a code signing requirement, beginning by first accessing a randomly selected memory region on the device which stores an unsigned just-in-time executable portion of code, and then executing the unsigned just-in-time executable portion of code as though it were signed computer code. The memory access permissions on the randomly selected memory region can be readable, writable, and executable. Accordingly, an application can perform operations in this memory region that can include reading data stored in the region, modifying the data, and executing instructions in the data.

The disclosure thus effectively provides a way to implement JIT in a secure system running code signing technologies, while significantly minimizing, via ASLR, the memory manipulation vulnerabilities in JIT. This can result in security and/or performance improvements. Accordingly, any device can benefit from the enhanced security and improved performance provided by the disclosed system, method, and non-transitory computer-readable storage media for processing just-in-time code.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example of computer code;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses at least one need in the art for implementing JIT in a secure system running code signing technologies. The approaches discussed herein can be used to execute an unsigned just-in-time portion of computer code in a system that enforces a code signing requirement. The system can use address space layout randomization to vitiate the memory manipulation vulnerabilities in JIT. The system allocates a randomly selected memory region on the device for the unsigned just-in-time portion of code, thereby decreasing the predictability of the memory layout and reducing the probability that a security attack will succeed. While the system enforces code signing requirements on the device, it can exempt the randomly selected memory region allocated for JIT from the code signing requirements. Thus, the unsigned just-in-time executable portion of code can be executed from the exempted region, notwithstanding the code signing requirement enforced at the device. Accordingly, the system provides the performance benefits of JIT, with the added security protections of ASLR and code signing technologies.

Figure 1:
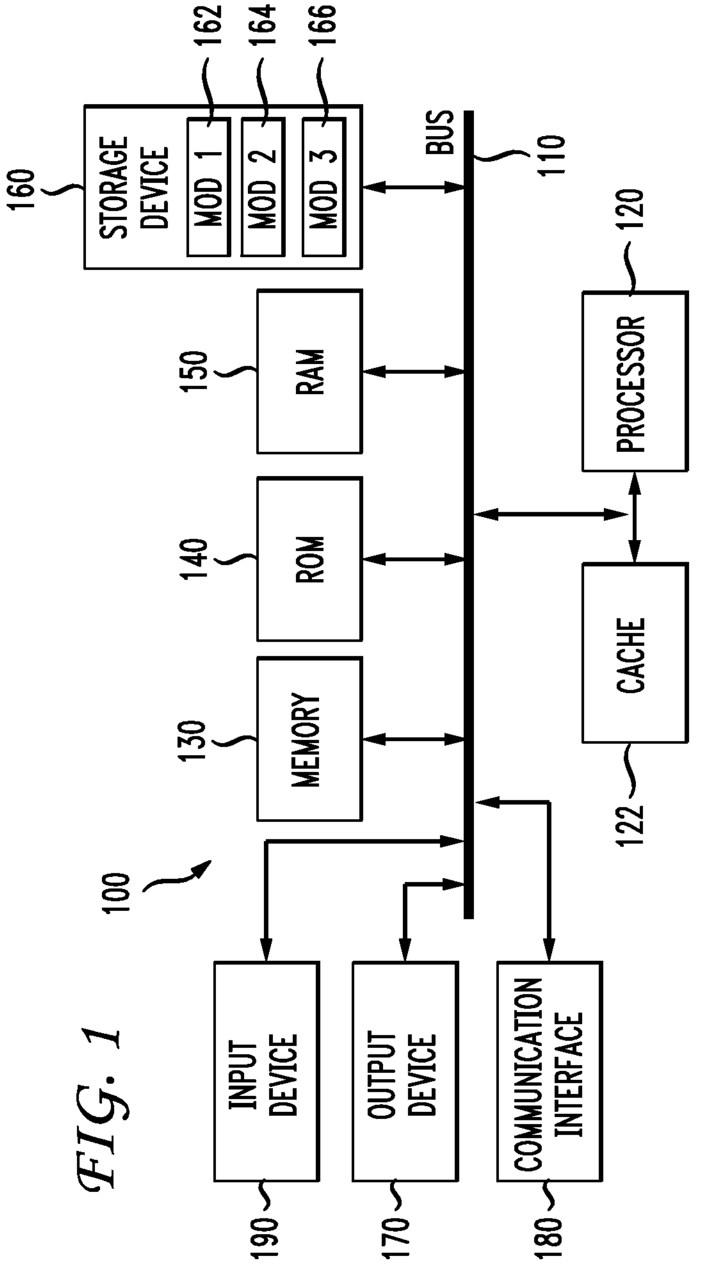
FIG. 1 illustrates an example system embodiment.

The disclosure first sets forth a brief introductory description of a basic general-purpose system or computing device in FIG. 1, which can be employed to practice the concepts disclosed herein. The disclosure then turns to a detailed description of an exemplary system for processing just-in-time code in FIG. 2, an exemplary illustration of computer code in FIG. 3, and an example of a randomized memory layout of an application in FIG. 4. Finally, the disclosure proceeds with two exemplary method embodiments in FIGS. 5 and 6. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics, including RAM, ROM, hard disk drives, optical storage devices, flash memory, and any other storage device. The system 100 can partition the system memory 130 into memory regions, which include one or more blocks of memory, and separate the memory addresses used by a process from actual physical addresses. The processing unit 120 can use the memory regions to allocate memory space throughout the system 100. For example, the processing unit 120 identifies memory regions and allocates memory areas (e.g., memory addresses) when processing unit 120 receives a memory request. Moreover, the system 100 can simulate additional random-access memory by using other storage devices, such as a hard disk, to create virtual memory, viz. addressable storage space created by mapping virtual addresses into real addresses.

It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, configured to control the processor 120. By way of example, Mod1 162 can be configured to control the processor 120 to enforce a code signing requirement on the system 100. Mod2 164 can be configured to control the processor 120 to randomly select memory regions on the system 100 and use the selected memory regions to allocate memory space throughout the system 100. Mod3 166 can be configured to control the processor to execute computer code, including static, interpreted, and just-in-time code—either signed or unsigned. These modules may be stored on the storage device 160 and loaded into RAM 150 or memory 130 at runtime or may be stored as would be known in the art in other computer-readable memory locations.

Figure 2:
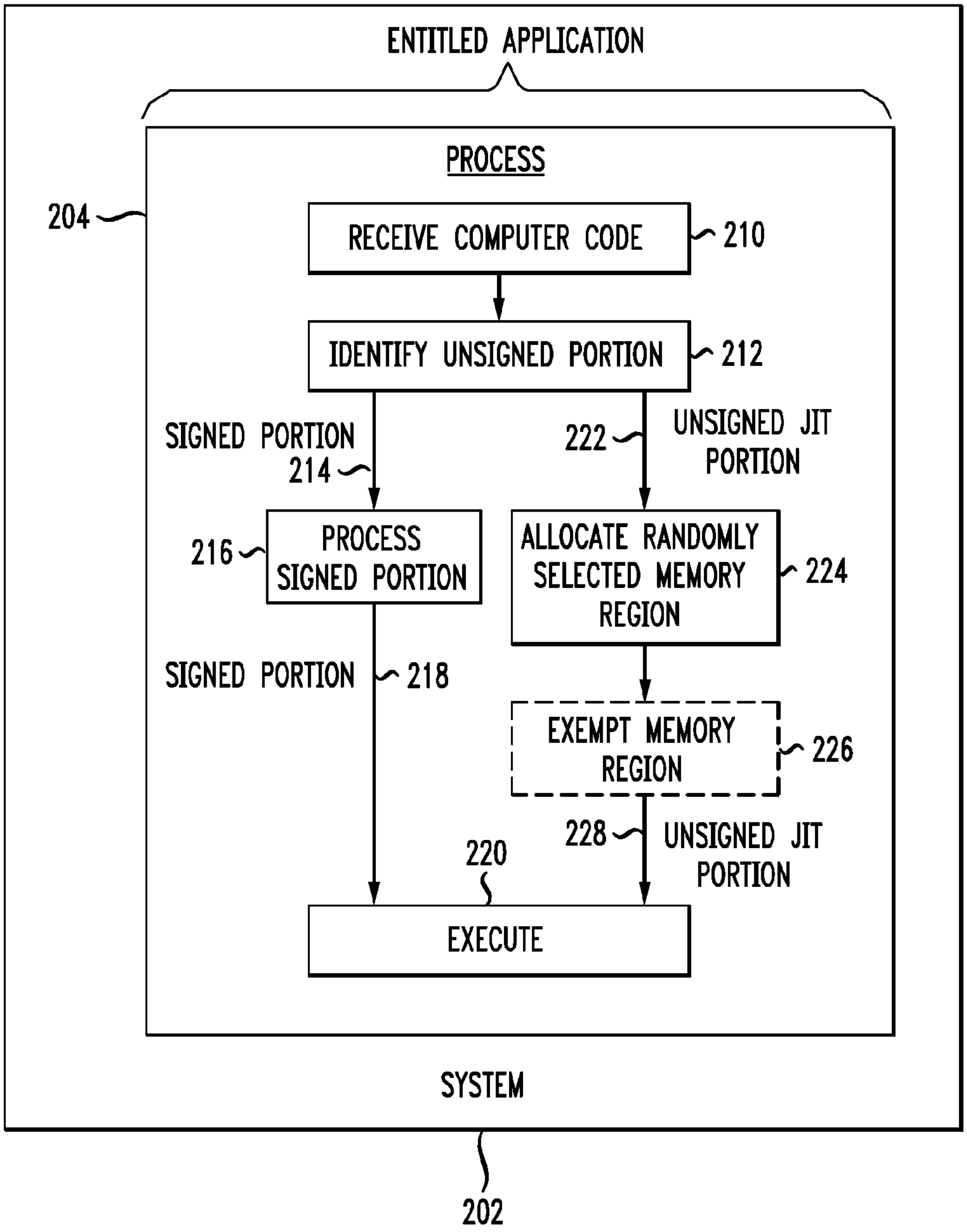
FIG. 2 illustrates an exemplary system for processing just-in-time code.

Having disclosed some components of a computing system, the disclosure now turns to FIG. 2, which illustrates an exemplary system for processing just-in-time code. For the sake of clarity, FIG. 2 is discussed in terms of an exemplary system, such as is shown in FIG. 1, configured to enforce a code signing requirement.

In this example, the just-in-time code is processed in the system 202 by an application with a specific entitlement. The specific entitlement ensures that the application has permission to process unsigned code. A specific entitlement can be a permission flag, attribute, reference, descriptor, or any other feature enforced by the operating system. In one aspect, the application can be a web browser. The web browser can be a "full" web browser such as Opera, Safari, or K-Meleon; or a "mobile" browser with a subset of "full" browser capabilities, such as Safari for iOS or Opera Mini.

The entitled application 204 in the system 202 first receives computer code 210, which includes a portion of code that is unsigned just-in-time executable code. The entitled application 204 then identifies the unsigned just-in-time executable portion of code 212. Identification can be based on a just-in-time flag in the code; a parser or other identifying component that extracts the just-in-time executable portion; a table of locations of just-in-time executable portions; a specific feature, characteristic, attribute, pattern or structure of the code; or any other form of identification such as identification through code analysis. After identifying the unsigned just-in-time executable portion of code 222, the entitled application 204 allocates a randomly selected memory region on the device for at least some of the unsigned just-in-time executable portion of code 224. The system can optionally process 216 signed portions of code 214 and pass the processed signed portions of code 218 to an execution module 220 to be executed.

To allocate the randomly selected memory region, the entitled application 204 can include a set of instructions, e.g., NtAllocateVirtualMemory, VirtualAlloc, vm_aslr_mmap, and vm_allocate. These functions can reserve a block of contiguous or noncontiguous addresses and allocate a region of pages within the reserved block of addresses. The block of addresses can be reserved from an arbitrarily sized memory region at an arbitrary address, which can be fixed or dynamically chosen. The entitled application 204 can select the randomly selected memory region, or simply use a memory region randomly selected by another system component, such as an operating system or a memory manager. The memory region is randomly selected in order to vitiate the memory manipulation vulnerabilities in JIT. By randomizing the memory layout of the executing code, the system 202 provides a level of security against attacks involving code injection or shellcode, as it decreases the predictability of the memory layout and reduces the probability that an attack will succeed. In one aspect, only one randomly selected memory region for the unsigned executable portion of code can be allocated per process. In another aspect, more than one randomly selected memory region for the unsigned executable portion of code can be allocated per process. In yet another aspect, one or more randomly selected memory regions and one or more non-randomly selected memory regions for the unsigned just-in-time executable portion of code can be allocated per process. This approach can be combined with other compatible security and/or performance enhancing techniques.

In one embodiment, the memory access permissions on the randomly selected memory region can be readable, writable, and executable. Accordingly, the entitled application 204 can perform operations in this memory region that can include reading data stored in the region, modifying the data, and executing instructions in the data. Thus, in this embodiment, the entitled application 204 can execute the unsigned just-in-time executable portion of code 222 in the randomly selected memory region 224 without the extra step of exempting the randomly selected memory region from the code signing requirement.

In another embodiment, the system 202 or entitled application 204 exempts the randomly selected memory region 226 allocated for at least some of the unsigned just-in-time executable portion of code 228 from the code signing requirement. The system 202 or entitled application 204 can exempt the randomly selected memory region after the entitled application 204 allocates the region for the unsigned just-in-time executable portion of code. The system 202 or entitled application 204 can also exempt the randomly selected memory region at the time—or before—the entitled application 204 allocates the region for the unsigned just-in-time executable portion of code 228. Finally, the entitled application 204 can execute or cause to be executed the unsigned just-in-time executable portion of code in the randomly selected memory region 220.

FIG. 3 illustrates an example of computer code 302 including a first unsigned just-in-time executable portion 306 and a second portion 308. The unsigned just-in-time executable portion 306 can include any portion of code, written in any programming language, where the code relies on just-in-time compilation. By contrast, the second portion 308 can include any portion of code, written in any programming language, and can be optionally digitally signed. As seen from FIG. 3, the unsigned just-in-time executable portion 306 can be JavaScript code, and the second portion 308 can be in markup language. Other examples of just-in-time languages include LISP, Java, and the .NET framework. Moreover, the computer code 302 can include a just-in-time flag 304, which the system 202 can use to identify the unsigned just-in-time executable portion 306 of the computer code 302. In an example, the just-in-time flag is a script tag 304.

Figure 4:
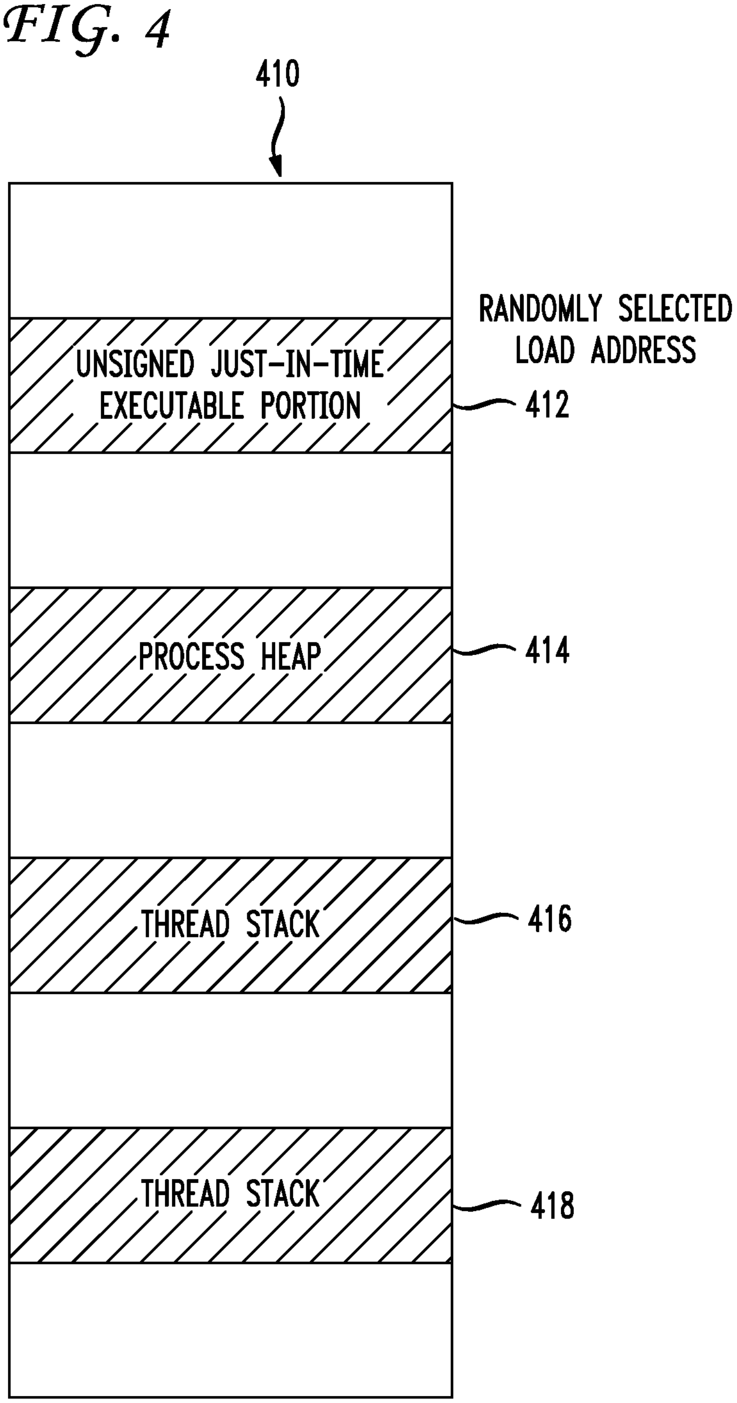
FIG. 4 illustrates an example of a randomized memory layout of an application.

FIG. 4 illustrates an example of a randomized memory layout of an application 410. In this example, a randomly selected memory region 412, or load address, has been allocated for storing an unsigned just-in-time executable portion of code. A randomly selected load address has also been allocated for key data areas, viz.: the process heap 414, a thread stack 416, and another thread stack 418. The memory layout of an application is randomized in order to protect against memory manipulation vulnerabilities. By randomizing the memory layout of the executing code, the application can guard against security attacks involving code injection or shellcode, as randomization decreases the predictability of the memory layout and reduces the probability that an attack will succeed.

Figure 5:
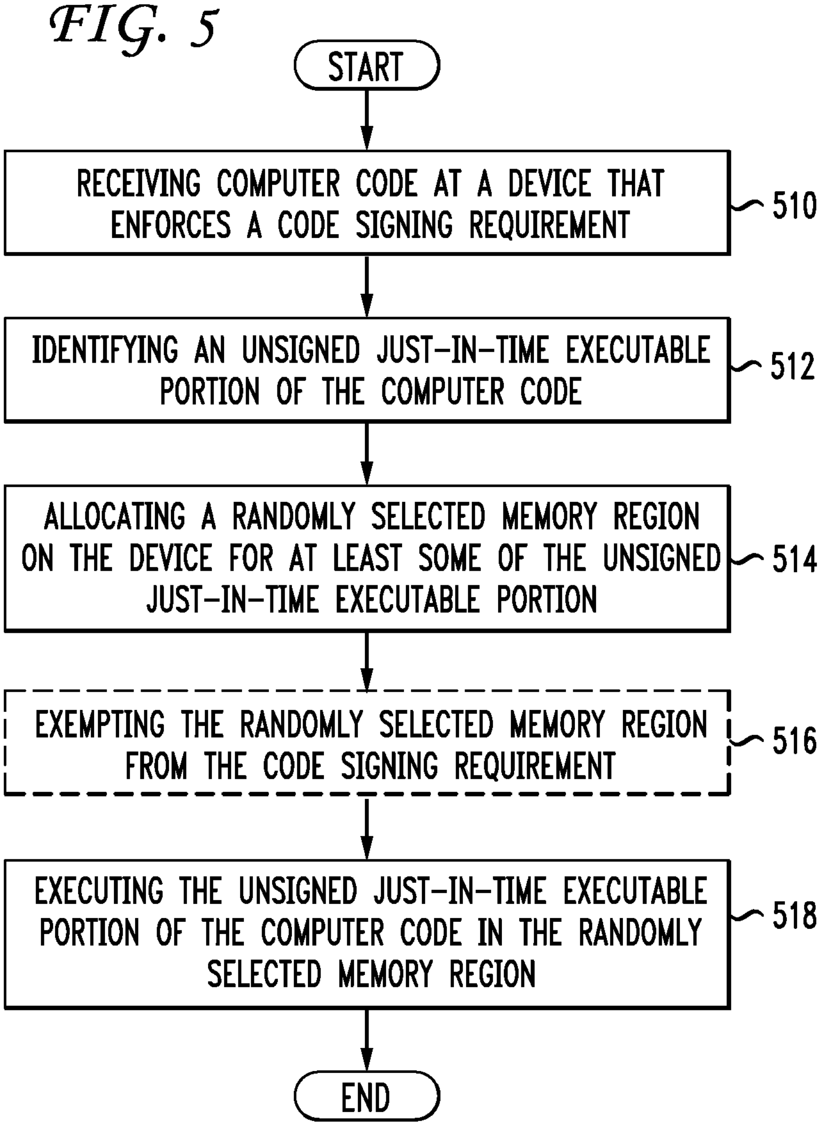
FIGS. 5 and 6 illustrate exemplary method embodiments.
Figure 6:
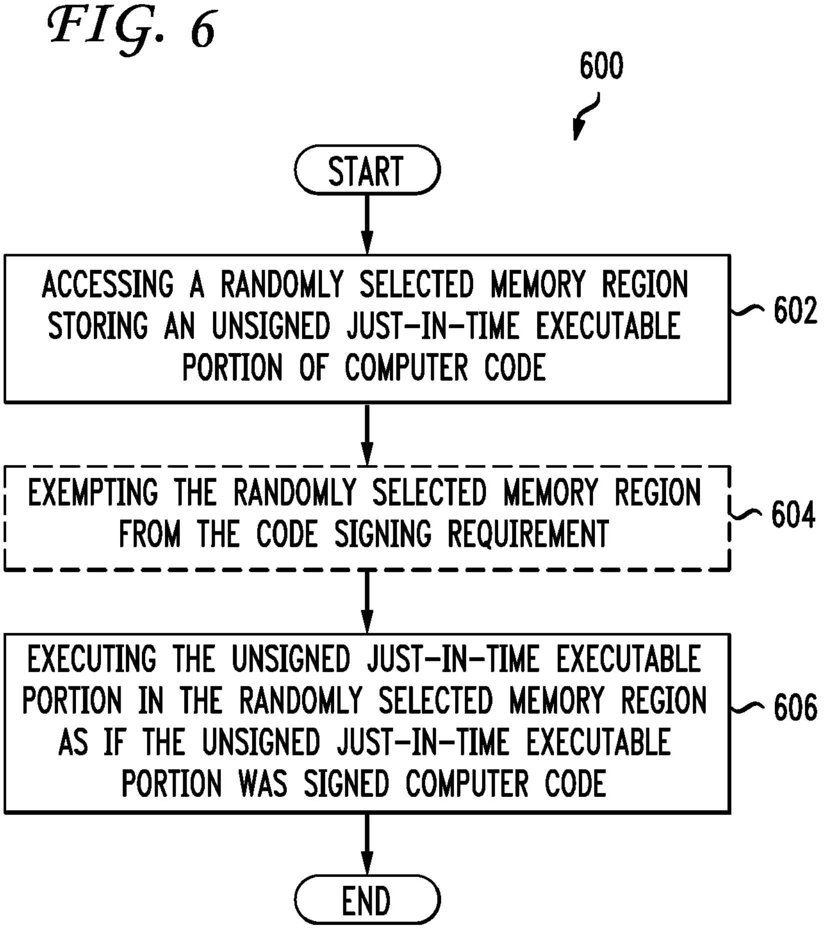

Having disclosed some basic system components and concepts, the disclosure now turns to the exemplary method embodiments shown in FIGS. 5 and 6. For the sake of clarity, the methods are discussed in terms of an exemplary system 100, as shown in FIG. 1, configured to practice the method. The steps outlined herein are exemplary and can be implemented in any combination thereof, including combinations that exclude, add, or modify certain steps.

FIG. 5 illustrates an exemplary method embodiment for processing just-in-time code at a device that is configured to enforce a code signing requirement. The device can be a mobile or other computing device, such as a smart phone, tablet, computer, GPS, portable media, and so forth. As seen from FIG. 5, the system first receives 510 computer code 302, where a portion of the code is unsigned just-in-time executable code 306. In particular embodiments, the just-in-time code is processed by an application with a specific entitlement. The specific entitlement of the application can be granted based on a certificate and a provisioning profile, and enforced through public key infrastructure (e.g., a public and private cryptographic key pair obtained and shared through a trusted authority) and one or more operating system level mechanisms (e.g., authentication, security policy, access controls, security protocols, cryptographic software and protocols, etc).

Next, the application identifies 512 the unsigned just-in-time executable portion of code 306. Identification can be performed as described above. The application then allocates 514 a randomly selected memory region 412 on the device for at least some of the unsigned just-in-time executable portion of code 306. In one aspect, the application can allocate a randomly selected memory region 412 on the device for part of the unsigned just-in-time executable portion of code 306, and another memory region for the remaining portion of unsigned just-in-time executable code 306. The memory region can be randomly selected by an operating system kernel running on the device and/or another application. In one aspect, the application can be prohibited from reusing the randomly selected memory region for the remaining process lifetime of the application. In another aspect, the application can be prohibited from sharing a memory page containing the randomly selected memory region.

In one embodiment, the system then exempts 516 the randomly selected memory region 412 from the code signing requirement, and the application executes 518 the unsigned just-in-time executable portion of code 306 in the randomly selected memory region 412.

In another embodiment, the application executes 518 the unsigned just-in-time executable portion of code 306 in the randomly selected memory region 412 without the extra step of exempting the randomly selected memory region 412 from the code signing requirement. Here, the memory access permissions on the randomly selected memory region are readable, writable, and executable. Thus, the application can perform operations in this memory region that can include reading data stored in the region, modifying the data, and executing instructions in the data. Moreover, the JIT compiler can use the randomly selected memory region 412 to create JIT-compiled code.

In one aspect, the system can toggle between a traditional JIT approach and the enhanced approach set forth herein. A programmer can indicate, for example, that one portion of JIT code is particularly sensitive or otherwise commands heightened speed and/or security. Similarly, if a web browser encounters JavaScript code from a trusted site, the system can process the JavaScript code in a traditional way, and if the web browser encounters JavaScript code from a potentially malicious or untrusted domain, the system can toggle to an enhanced security mode for handling that JavaScript code. The system can toggle between "regular" and "enhanced" JIT code handling based on one or more internal and/or external events, such as user input, a database of trusted sites, certain code patterns, user/device preferences, etc. A network-based server can dictate the JIT code handling mode for a group of devices.

FIG. 6 illustrates an embodiment 600 of a method for executing just-in-time code at a device configured to enforce a code signing requirement. The device can enforce the code signing requirement for some or all of the code it executes. Moreover, the memory access permissions on the randomly selected memory region 412 can be readable, writable, and executable.

As seen in FIG. 6, the application in the system first accesses 602 a randomly selected memory region 412 storing an unsigned just-in-time executable portion 306 of computer code 302. In this example, the access permissions on the randomly selected memory region 412 are readable, writable, and executable. The unsigned just-in-time executable portion of code in the randomly selected memory region 412, for example, can be a JavaScript script with a helloWorld function:

```
<script type="text/javascript">
function helloWorld( )
{
        alert("Hello World!") ;
}
</script>
```

The system optionally, as shown by the dashed box, exempts 604 the randomly selected memory region 412 from the code signing requirement, and the application then executes 606 the unsigned just-in-time executable portion of code 306 in the randomly selected memory region 412. For example, the application can execute the helloWorld function after the system or application exempts from the code signing requirement, the randomly selected memory region storing the JavaScript script.

Alternatively, the application can execute 606 the unsigned just-in-time executable portion of code 306 in the randomly selected memory region 412 without the extra step of exempting the randomly selected memory region 412 from the code signing requirement. Here, the application has a specific entitlement, allowing it to process unsigned code. For example, the application can have a specific entitlement, and thus execute the helloWorld function without the extra step of exempting the randomly selected memory region 412 from the code signing requirement.

These approaches can be used to execute unsigned, JIT-compiled code in a system that enforces a code signing requirement, using address space layout randomization to vitiate memory manipulation vulnerabilities in JIT. Accordingly, these approaches allow a secure system that enforces code signing requirements to implement JIT with randomly allocated memory ranges, resulting in increased security and/or performance.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein may be applied in mobile devices such as a mobile phone or tablet, or in a desktop computing device that runs signed code. Those skilled in the art will readily recognize various modifications and changes that may be made to the principles described herein without following the example embodiments and applications illustrated and described herein, and without departing from the spirit and scope of the disclosure.

We claim:

1. A method of processing just-in-time code, the method comprising:

reserving a block of a memory of a device via an application running on the device, the application having a memory layout in the memory, the block of memory specified via a plurality of addresses in the memory;

receiving computer code by the application at a device that enforces a code signing requirement;

identifying an unsigned just-in-time executable portion of the computer code based on attributes in the computer code;

randomly selecting a memory region within the block of memory in the memory of the device, the randomly selected memory region having a load address in the memory, wherein the block of memory includes at least a previously selected memory region which is prohibited from being reused by the application and wherein the randomly selected memory region does not include addresses of the previously selected memory region;

loading the unsigned just-in-time executable portion of the computer code to the randomly selected memory region via the load address of the memory to randomize the memory layout; and executing the unsigned just-in-time executable portion in the randomly selected memory region as if the unsigned just-in-time executable portion was signed computer code.

2. The method of claim 1, wherein identifying the unsigned just-in-time executable portion of the received computer code is based on a just-in-time flag in the computer code.

3. The method of claim 1, wherein the unsigned just-in-time executable portion of computer code is processed by an application with a specific entitlement.

4. The method of claim 3, wherein the specific entitlement of the application is granted based on a certificate and a provisioning profile.

5. The method of claim 3, wherein the specific entitlement of the application is enforced through public key infrastructure and at least one operating system level mechanism.

6. The method of claim 1, wherein only one randomly selected memory region for the unsigned just-in-time executable portion of computer code can be allocated per process.

7. The method of claim 1, further comprising prohibiting the application from reusing the randomly selected memory region for a remaining process lifetime of the application.

8. The method of claim 1, further comprising prohibiting sharing of a memory page containing the randomly selected memory region.

9. A system for processing just-in-time code in accordance with a code signing requirement, the system comprising:

a memory;

a processor, wherein the processor is configured to reserve a block of the memory, the block of memory specified via a plurality of addresses in the memory, and randomly select a memory region within the block of memory, wherein the block of memory includes at least a previously selected memory region which is prohibited from being reused and wherein the randomly selected memory region does not include addresses of the previously selected memory region;

a first module configured to control the processor to receive computer code, the computer code associated with a memory layout in the memory for execution;

a second module configured to control the processor to identify an unsigned just-in-time executable portion of the computer code based on attributes of the computer code;

a third module configured to control the processor to allocate the randomly selected memory region in the memory for at least some of the unsigned just-in-time executable portion, the selected memory region having a load address in the memory, wherein the unsigned just-in-time executable portion of the computer code is loaded to the load address of the memory to randomize the memory layout of the computer code;

a fourth module configured to control the processor to exempt the randomly selected memory region from the code signing requirement; and a fifth module configured to control the processor to execute the unsigned just-in-time executable portion.

10. The system of claim 9, wherein the unsigned just-in-time executable portion of computer code is processed by an application with a specific entitlement.

11. The system of claim 9, wherein only one randomly selected memory region for the unsigned just-in-time executable portion of computer code can be allocated per process.

12. The system of claim 9, wherein an operating system kernel running on the device selects the randomly selected memory region.

13. A non-transitory computer-readable storage medium storing instructions for processing just-in-time code and which, when executed by a computing device that enforces a code signing requirement, cause the computing device to perform steps comprising:

reserving a block of a memory of the computer device, the block of memory specified via a plurality of addresses in the memory;

identifying an unsigned just-in-time executable portion of computer code received at the computing device, the identification based on attributes of the computer code, the computer code associated with a memory layout in the memory of the computer device for execution;

randomly selecting a memory region within the block of memory in the memory for storing the unsigned just-in-time executable portion of computer code, the randomly selected memory region having a load address in the memory, wherein the block of memory includes at least a previously selected memory region which is prohibited from being reused and wherein the randomly selected memory region does not include addresses of the previously selected memory region, wherein the unsigned just-in-time executable portion of the computer code is loaded to the randomly selected memory region via the load address of the memory to randomize the memory layout of the computer code; and executing the unsigned just-in-time executable portion in the randomly selected memory region as if the unsigned just-in-time executable portion was signed computer code.

14. The non-transitory computer-readable storage medium of claim 13, wherein identifying the unsigned just-in-time executable portion of the received computer code is based on a just-in-time flag in the computer code.

15. The non-transitory computer-readable storage medium of claim 13, wherein the unsigned just-in-time executable portion of computer code is processed by an application with a specific entitlement.

16. The non-transitory computer-readable storage medium of claim 13, wherein the specific entitlement of the application is enforced through public key infrastructure and at least one operating system level mechanism.

17. A machine implemented method performed by an application for processing an unsigned just-in-time executable portion of a markup language document in a device that enforces a code signing requirement, the application performing steps comprising:

reserving a block of a memory of the device via the application, the block of memory specified via a plurality of addresses in the memory, the application having a memory layout in the memory;

identifying the unsigned just-in-time executable portion of the markup language document based on attributes of the document;

selecting randomly a memory region within the block of memory in the memory of the device for the unsigned just-in-time executable portion of the markup language document, the randomly selected memory region having a load address in the memory, wherein the block of memory includes at least a previously selected memory region which is prohibited from being reused by the application and wherein the randomly selected memory region does not include addresses of the previously selected memory region, wherein the unsigned just-in-time executable portion of the markup language document is loaded to the randomly selected memory region via the load address of the memory to randomize the memory layout of the application;

accessing the randomly selected memory region storing the unsigned just-in-time executable portion of computer code;

exempting the randomly selected memory region from the code signing requirement; and executing with a processor the unsigned just-in-time executable portion in the randomly selected memory region.

18. The application of claim 17, wherein the unsigned just-in-time executable portion of computer code is JavaScript code.

19. The application of claim 17, wherein the application is a web browser.

20. The application of claim 17, further comprising an application with a specific entitlement.

21. A machine implemented method of executing just-in-time code for an executable code in a device that enforces a code signing requirement, comprising:

reserving a block of a memory of the device, the block of memory specified via a plurality of addresses in the memory;

selecting randomly a memory region within the block of memory in thee memory of the device for an unsigned just-in-time executable portion of computer code in the executable code, the executable code associated with a memory layout in the memory for execution, the randomly selected memory region having a load address in the memory, wherein the block of memory includes at least a previously selected memory region which is prohibited from being reused and wherein the randomly selected memory region does not include addresses of the previously selected memory region;

loading the unsigned just-in-time executable portion of computer code to the load address of the memory to randomize the memory layout of the executable code;

accessing the randomly selected memory region for the unsigned just-in-time executable portion of computer code; and executing the unsigned just-in-time executable portion in the randomly selected memory region as if the unsigned just-in-time executable portion was signed computer code.

22. The method of claim 21, wherein the unsigned just-in-time executable portion of computer code is processed by an application with a specific entitlement.

23. The method of claim 21, wherein the randomly selected memory region is readable, writable, and executable.

24. The method of claim 21, wherein an operating system kernel running on the device selects the randomly selected memory region.

25. A non-transitory computer-readable storage medium storing instructions for processing just-in-time code and which, when executed by a computing device, cause the computing device to perform a method comprising:

reserving a block of a memory of a device via an application running on the device, the application having a memory layout in the memory, the block of memory specified via a plurality of addresses in the memory;

receiving computer code by the application at the device that enforces a code signing requirement;

identifying an unsigned just-in-time executable portion of the computer code based on attributes of the computer code;

randomly selecting a memory region within the block of memory in the memory of the device for at least some of the unsigned just-in-time executable portion, the randomly selected memory region having a load address in the memory, wherein the block of memory includes at least a previously selected memory region which is prohibited from being reused by the application and wherein the randomly selected memory region does not include addresses of the previously selected memory region;

loading the unsigned just-in-time executable portion of the computer code to the randomly selected memory region via the load address of the memory to randomize the memory layout; and executing the unsigned just-in-time executable portion in the randomly selected memory region as if the unsigned just-in-time executable portion was signed computer code.

26. A non-transitory computer-readable storage medium storing instructions which, when executed by a computing device, cause the computing device to perform a method comprising:

reserving a block of a memory of the device via an application running on the device, the block of memory specified via a plurality of addresses in the memory;

identifying an unsigned just-in-time executable portion of a markup language document of a computer code for the application, the identification based on attributes of the computer code, the device including a memory, the application associated with a memory layout in the memory for execution;

selecting randomly a memory region within the block of memory in the memory of the device for the unsigned just-in-time executable portion of the markup language document, the randomly selected memory region having a load address in the memory, wherein the block of memory includes at least a previously selected memory region which is prohibited from being reused by the application and wherein the randomly selected memory region does not include addresses of the previously selected memory region, wherein the unsigned just-in-time executable portion of the markup language document is loaded to the randomly selected memory region via the load address of the memory to randomize the memory layout of the application;

accessing the randomly selected memory region storing the unsigned just-in-time executable portion of the computer code;

exempting the randomly selected memory region from the code signing requirement; and executing with a processor the unsigned just-in-time executable portion in the randomly selected memory region.

27. A non-transitory computer-readable storage medium storing instructions which, when executed by a computing device, cause the computing device to perform a method comprising:

reserving a block of a memory of a device, the block specified via a plurality of addresses in the memory;

selecting randomly a memory region within the block of memory in the memory of the device for an unsigned just-in-time executable portion of computer code for an executable code, wherein the block of memory includes at least a previously selected memory region which is prohibited from being reused by the executable code and wherein the randomly selected memory region does not include addresses of the previously selected memory region, the executable code associated with a memory layout in the memory for execution, the randomly selected memory region having a load address in the memory;

loading the unsigned just-in-time executable portion of computer code to randomly selected memory region via the load address of the memory to randomize the memory layout of the executable code;

accessing the randomly selected memory region for the unsigned just-in-time executable portion of computer code; and executing the unsigned just-in-time executable portion in the randomly selected memory region as if the unsigned just-in-time executable portion was signed computer code.

* * * * *